March 23, 1943.        D. F. HYLAND ET AL        2,314,541
MACHINE FOR MAKING LIFT-BLANKS
Filed Aug. 30, 1941        6 Sheets-Sheet 1
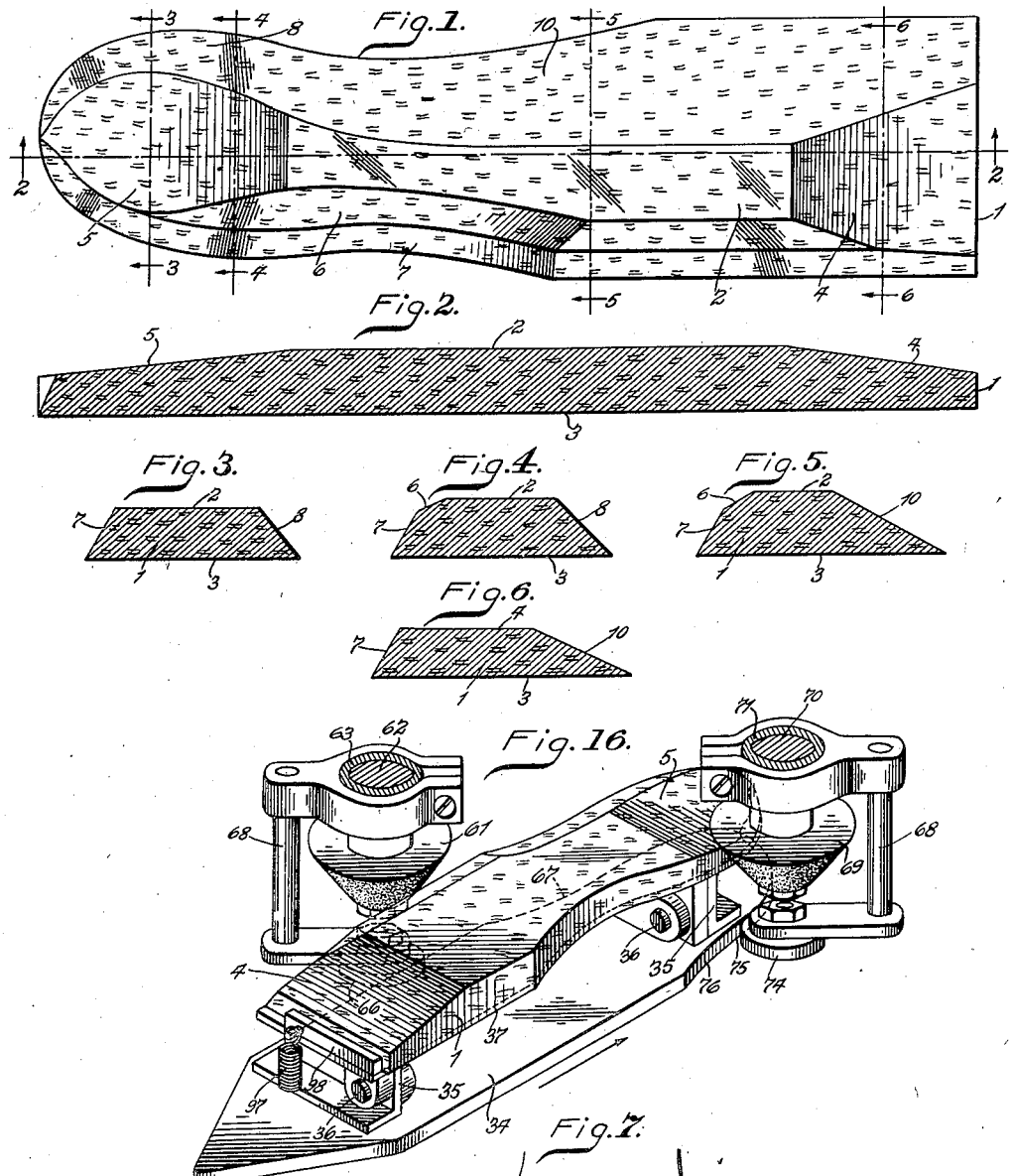

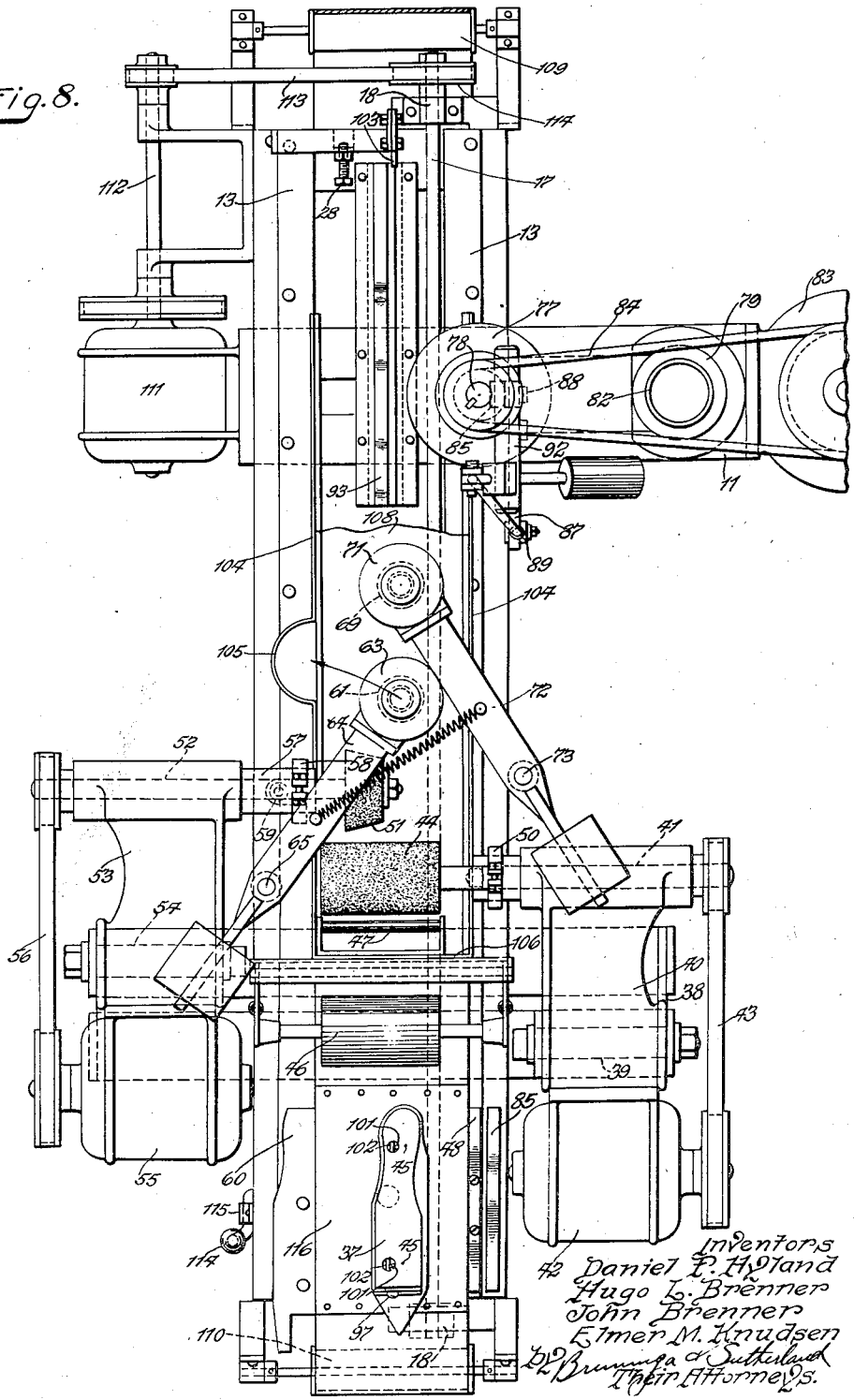

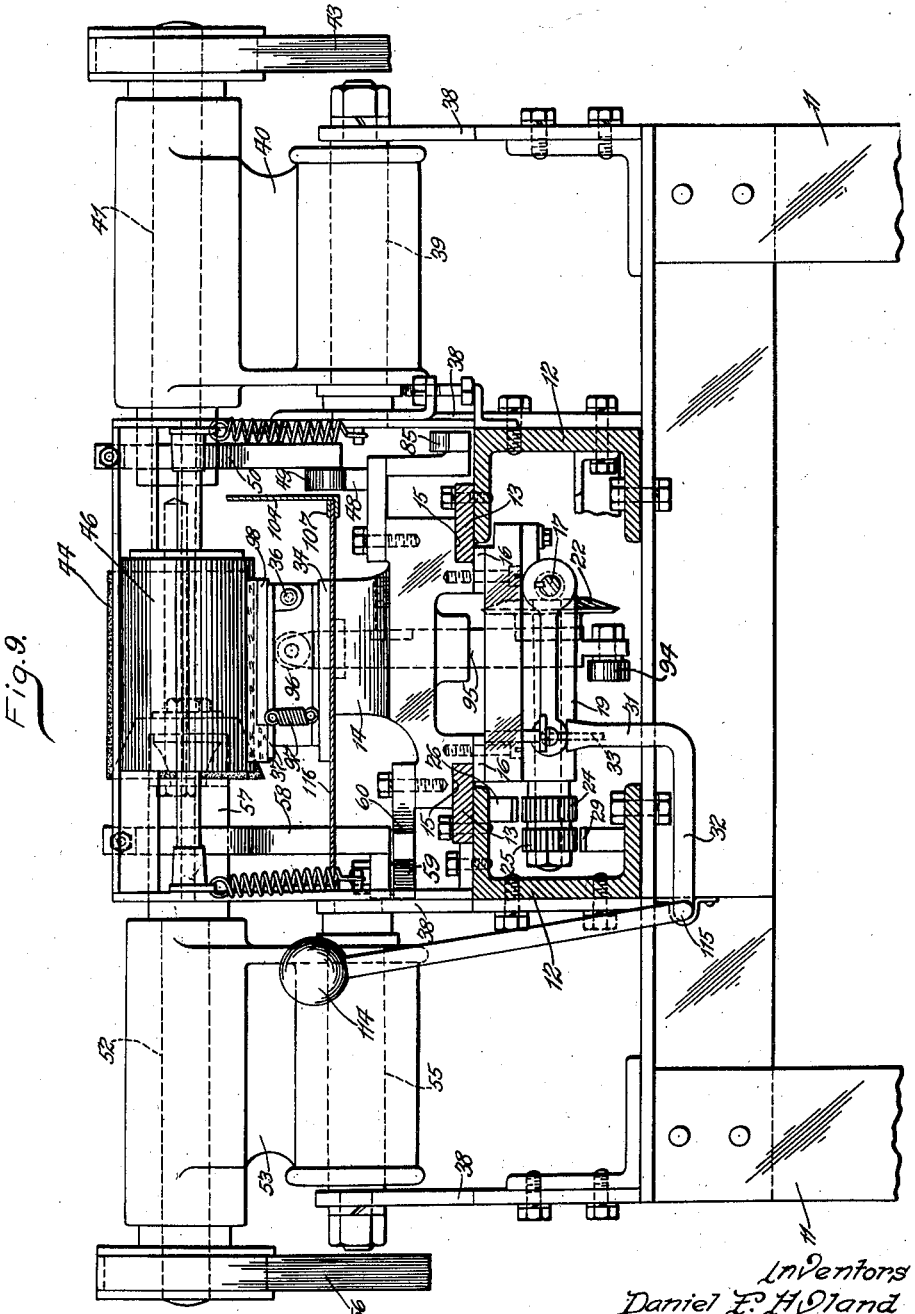

March 23, 1943.  D. F. HYLAND ET AL  2,314,541
MACHINE FOR MAKING LIFT-BLANKS
Filed Aug. 30, 1941  6 Sheets-Sheet 4
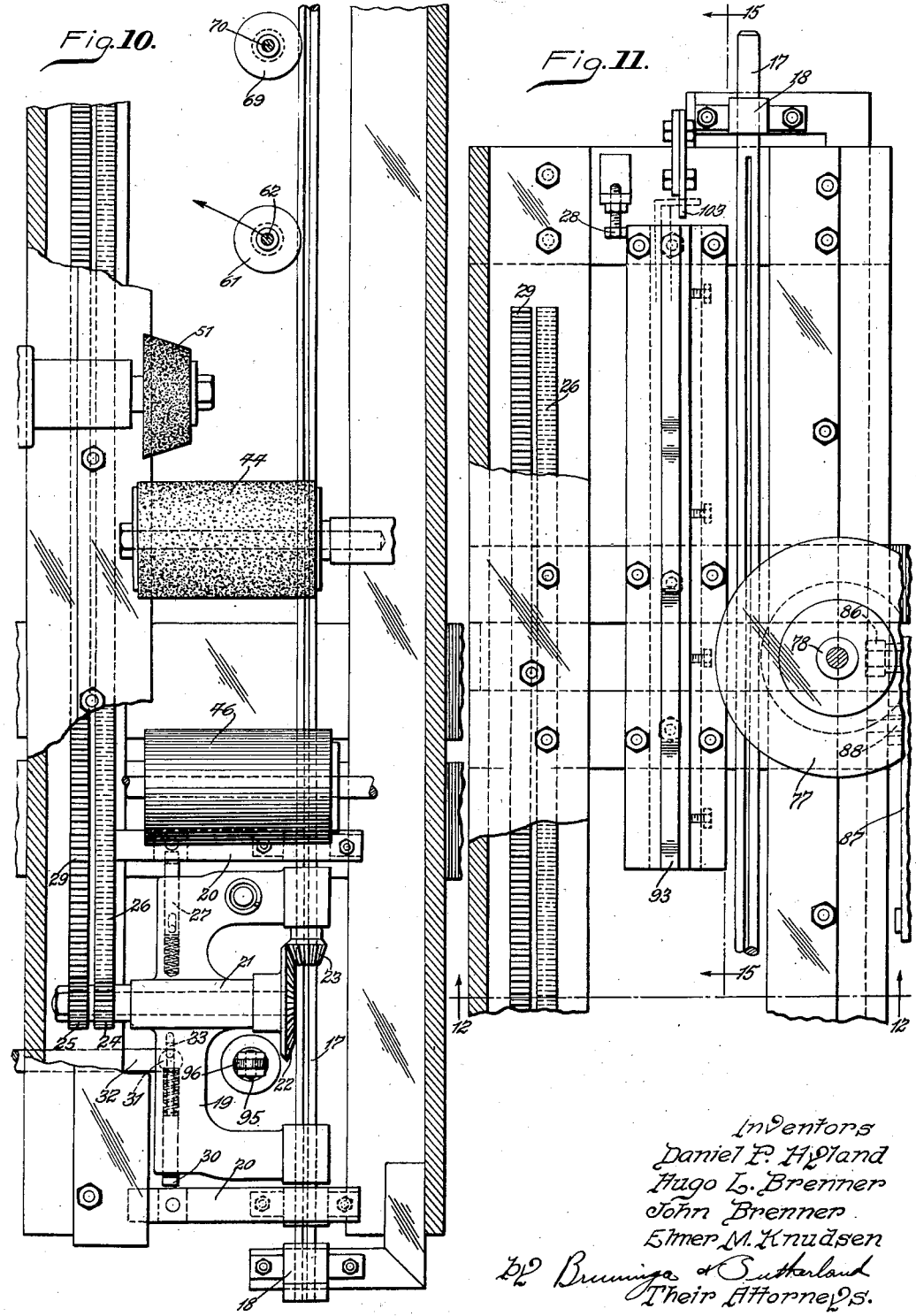
Inventors
Daniel F. Hyland
Hugo L. Brenner
John Brenner
Elmer M. Knudsen
Bruninga & Sutherland
Their Attorneys

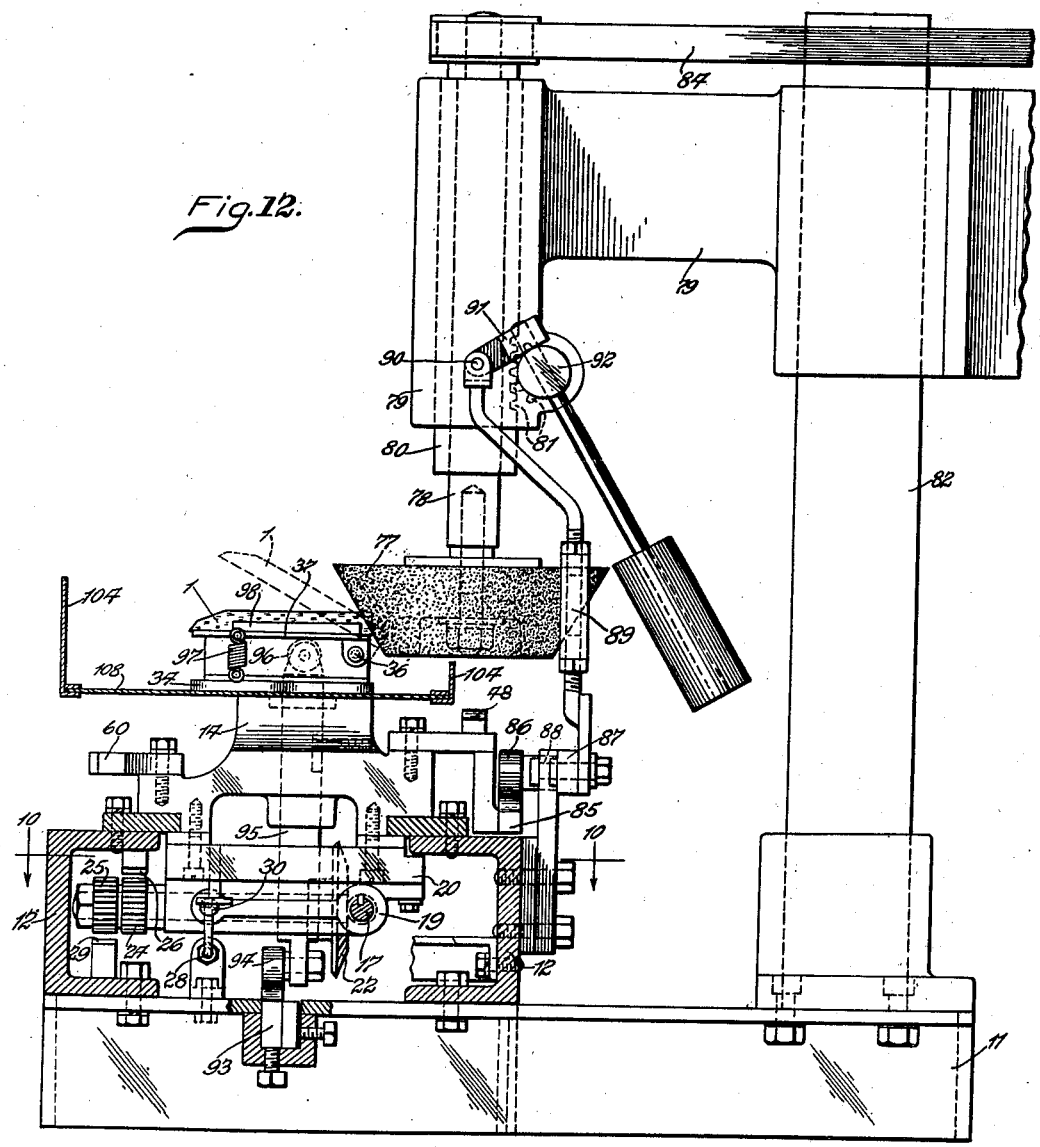

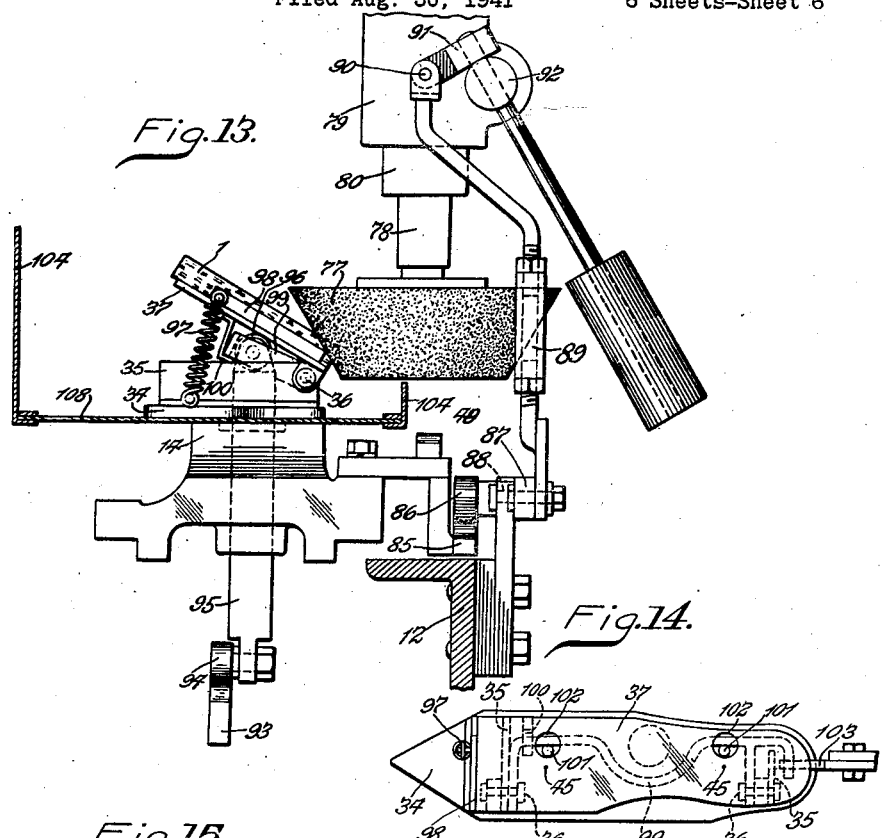

Patented Mar. 23, 1943

2,314,541

UNITED STATES PATENT OFFICE 2,314,541

MACHINE FOR MAKING LIFT BLANKS

Daniel F. Hyland, Hugo L. Brenner, John Brenner, and Elmer M. Knudsen, St. Louis, Mo., assignors to Arch-O-Graph Company, St. Louis, Mo., a corporation of Missouri Application August 30, 1941, Serial No. 408,930

16 Claims. (Cl. 12—60)

This invention pertains to apparatus for making blanks out of which may be formed lifts such as are inserted in shoes to make them fit the feet properly or as a corrective appliance to remedy certain foot ailments. Such lifts are sometimes formed by cutting or shaping a blank in the desired manner. Where the lift is used to fit a shoe to a foot, it is usually desirable to carry out the lift-forming operation as speedily as possible, particularly when this operation is performed while the customer is waiting. Under such circumstances it is desirable to have a lift-blank which is of such form initially that a minimum amount of cutting or shaping is required to bring it to its final form.

A special shape of blank answering these requirements has been devised. This blank is not, however, claimed in this application but is included in the subject-matter of application Serial Number 441,540, filed May 2, 1942.

One of the objects of the present invention, therefore, is to provide a machine by means of which a blank of this special shape may be formed.

Another object is to provide such a machine which will form a plurality of surfaces of such a blank to more or less irregular forms as desired.

Another object is to provide such a machine with suitable shaping tools and controlling means therefore to form a plurality of irregular surfaces on the blank at a single handling of the blank.

Another object is to provide apparatus whereby certain portions of the blank may be formed to approximate the shape of a foot at the point adjacent to which the blank is to engage the foot.

Another object is to provide such apparatus which shall be simple in construction and operation and which may be equipped interchangeably with various control elements, such as cams or other elements, so that by suitable application of such elements to the apparatus a blank adapted for forming a lift for any desired shoe size may be made.

Further objects will appear from the following description taken in connection with the accompanying drawings, in which:

Figure 1 is a plan view of one form of a completed lift-blank to be formed by apparatus embodying this invention;

Figures 2, 3, 4, 5, and 6 are sections, respectively, on lines 2—2, 3—3, 4—4, 5—5, and 6—6 of Figure 1.

Figure 7 is an outline of a foot indicating a certain surface thereof.

Figure 8 is a plan view of an apparatus embodying this invention.

Figure 9 is an end view as seen from the bottom end of Figure 8, somewhat enlarged, with parts in section.

Figure 10 is an enlarged plan view, partly in section, of the front portion of the machine of Figure 8.

Figure 11 is a similar view of the rear portion.

Figure 12 is a section taken about on line 12 of Figure 11, showing the carriage near the end of its travel.

Figure 13 is a detail of Figure 12.

Figure 14 is a plan view of the tiltable table for holding the lift-blank.

Figure 15 is a detail taken about on line 15—15 of Figure 11 to illustrate the action of tilting the blank table; and Figure 16 is a perspective view, somewhat enlarged, showing the relation of the blank table to certain of the shaping cutters and the operations of the latter on the blank.

Referring first to Figures 1 to 6, inclusive, showing the blank, Figure 1 shows the plan view thereof in the position in which it is placed in the machine. In this position, the bottom surface of the blank is flat and the machine operates to form the upper surfaces to the particular shapes indicated. The blank may be constructed of any suitable material. It has been found that sheet cork of a thickness of about three-eighths inch provides a very suitable material for the purpose. This sheet cork is usually made up of comminuted cork formed into a sheet by pressure, a suitable binder being used if necessary. This forms a flat plate of quite uniform texture which has a degree of resiliency suitable for the purposes of lifts to be placed in shoes.

In Figures 1 to 6 the blank is indicated generally by the numeral 1. In the following description the terms "top" and "bottom" will be used to refer to the blank in the position it is placed in the machine. When it is actually placed in the shoe, it is inverted with respect to this position. Accordingly, Figure 1 shows a top surface 2 which may be practically level or parallel with the bottom surface 3. At the forward end of the blank a flat inclined surface 4 is formed, while at the rear a similar oppositely sloping surface 5 is formed. The inclinations of these two surfaces may be the same but are usually different. Extending along the surfaces 2, 4, and 5 on the outside of the blank with reference to its position in the shoe (lower side in Figure 1) is a beveled surface 6, which, for identification in the present description, will be termed the outside top bevel. On the same side of the blank and extending from end to end thereof is a lower outside bevel 7. Extending from the rear of the heel on the inside thereof and forwardly to about the junction between the surfaces 2 and 5 is an inside heel bevel, indicated at 8.

In one process of forming lifts for fitting shoes to feet the lift is formed in a machine in which the shoe to be fitted is placed in a holder and a stylus is passed over the inside surface of the shoe, which stylus is connected to control movements of a shaping element operating on the lift-blank. Such an apparatus is described in application Serial Number 344,458, filed July 8, 1940. In performing this operation of passing the stylus along the inside surface of the shoe, that portion of the shoe which engages the inner longitudinal arch of the foot is usually of soft leather. This portion of the foot surface, which will be referred to herein as the inner longitudinal arch of the foot, is indicated at 9 in Figure 7. This portion of the shoe which engages the inner longitudinal arch of the foot is usually so flexible as to offer very little resistance to the touch of a stylus, and, accordingly, it is difficult to follow this surface accurately by contact with the inside of the shoe. In order to overcome this difficulty, the lift-blank is originally formed with the portion thereof which will engage this part of the shoe, "preformed" to a shape closely approximating that of this portion of the foot for the size of shoe for which the blank is intended. This preformed surface is indicated in Figure 1 at 10 and extends from the end of the surface 8 adjacent the junction of the surfaces 2 and 5 forwardly to the front end of the blank. As the slope of the surface 10 changes progressively along the length of the blank, it is termed in this description and the appended claims a "warped" surface. This surface does not necessarily conform to the mathematical definition of a warped surface, but this term is used for want of a better to describe the twisted beveled form of this surface.

In accordance with this invention the apparatus selected for illustration as embodying this invention comprises a carrier for the blank, which carrier travels along ways and the blank thereon is operated upon during that travel by a series of shaping tools engaging the blank successively or simultaneously and suitably controlled in their movements with reference to the blank so as to shape the surfaces illustrated in Figures 1 to 6.

Referring now more particularly to Figures 8 to 11, inclusive, the machine comprises a base 11 which may be made as a casting or of suitable structural elements. Mounted on the base 11 is a pair of beams 12, illustrated as structural channels mounted with their webs vertical and their flanges extending inwardly. Suitably secured to the beams 12 is a pair of plates or strips 13 forming ways upon which the carriage may travel. The carriage 14 is provided with suitable bearing seats 15, arranged to slide upon the ways 13, and suitable gibbs 16, are secured to the carriage, so as to retain the same in engagement with the ways 13.

In order to cause the carriage to travel along the ways, drive mechanism is provided therefor, including a drive shaft 17 extending the entire length of the ways and mounted in suitable bearings 18 near its ends. Mounted to pivot for limited rocking movement on the drive shaft 17 is a counter-shaft bracket 19. This bracket is best seen in plan view in Figure 10. While pivoted on the drive shaft 17 it is confined at its ends between the end walls 20 of the carriage 14, so that movement by the bracket 19 along the shaft 17 will move the carriage 14 along with it. Journaled in the bracket 19 is a counter-shaft 21, having mounted thereon at one end a bevel gear 22 engaging a complementary bevel gear 23 splined on the drive shaft 17. The opposite end of the counter-shaft 21 has mounted thereon two pinions 24 and 25.

The pinion 24 is positioned so that it may be engaged with an inverted rack 26 when the bracket 19 is rocked upwardly on the shaft 17. When the parts are in this position the pinion 24 is in driving engagement with the rack 26, which rack extends the full length of the machine. As the drive shaft 17, operating through the gears 22 and 23, drives the counter-shaft 21 which carries the pinion 24, the carriage will be moved rearwardly along the ways 13 so long as this engagement of the pinion 24 with the rack 26 is maintained. In order to maintain this engagement, a spring latch 27 is provided, engaging a suitable detent on the rear wall 20 of the carriage. At the rear end of the travel of the carriage an adjustable stop 28 is provided (Figure 11), which stop is struck by a shoulder on the latch 27, operating under the movement of the carriage to retract the latch from its detent and release the bracket 19. This bracket when so released drops until the pinion 25 comes into engagement with a second rack 29 therebelow. The rack 29 also extends the full length of the machine, and in cooperation with the pinion 25 serves to move the carriage forwardly to return it to its initial position at the front end of the machine. When the bracket 19 has dropped to this return position, a second spring latch 30 engages another detent on the front wall 20 of the carriage so as to retain the bracket 19 in position for return engagement of the pinion 25 until its forward travel is completed. On completion of such travel the upright end portion 31 of a starting lever 32 engages a downwardly extending arm 33 on the latch 30 to withdraw the latch and permit the bracket 19 to return to neutral position, disengaging the pinion 25 from the rack 29.

Removably mounted on the carriage 14 is a blank holder, including a lower cam plate 34 having upright supports 35 thereon, on which supports is pivoted at 36 a table 37 upon which the blank 1 may be mounted. When so mounted the blank may be carried, by the movement described above, from the front to the rear of the machine with the travel of the carriage.

Mounted on the base 11 in any suitable manner, as by means of upright brackets 38, is a pivot bar 39 on which is pivoted a swinging bracket 40. Suitably journaled in the bracket 40 is a spindle 41, and mounted also on the bracket 40 is a motor 42 connected by means of a belt 43 to drive the spindle 41. The spindle 41 has mounted on the end thereof a shaping tool 44 adapted to form one or more of the surfaces on the blank. The tool 44 may be of any suitable character for operating on the material of the blank. It has been found that with the cork material described above the tool 44 may be in the form of a suitable drum, covered by sandpaper of a proper degree of coarseness, or similar abrasive material. The tool 44 is arranged in the machine herein illustrated to form the surfaces 5, 2, and 4, as shown in Figure 1, in the order named as the blank is carried past this tool.

The blank is placed upon the table 37, which table may be provided with a pair of upstanding pins or spikes 45 (Figure 14). The blank is simply pressed down upon these pins by the operator and the machine is then started to move the carriage rearwardly. As the carriage moves rearwardly the blank is first carried beneath a pressure roll 46 suitably journaled on the base, which roll serves to press the blank firmly down upon the pins 45 so as to locate it properly on the table 37. The blank then passes on, and just before it passes under the tool 44 a second retaining roll 47, mounted just ahead of the tool 44, engages the blank to hold it down against the force of the tool 44 so as to prevent the end of the blank tipping up under the action of the tool 44, which rotates against the direction of movement of the blank. The blank moves with the heel portion first, and during its passage under the tool 44 said tool is raised and lowered under suitable control so as to form successively the surfaces 5, 2, and 4.

The control of the movement of the tool 44 is accomplished by a strip cam 48 mounted on the carriage 14, upon which a follower roller 49 rolls. This roller is carried by an arm 50, connected to raise and lower the spindle 41 in accordance with the shape of the cam 48. During this movement of the spindle 41 the bracket 40 rocks on its pivot 39. Accordingly, the movement of the tool 44 is controlled by the cam 48 so as to form the top surfaces 5, 2, and 4 on the blank.

After the blank has passed the tool 44 it comes into engagement with a second shaping tool 51, mounted on a spindle 52, journaled in a bracket 53. The bracket 53 is similar to the bracket 40 and is similarly mounted on a pivot 54, and carries a motor 55 connected by a belt 56 to drive the spindle 52. The spindle 52 is mounted for endwise movement in the bracket 53. This mounting may be similar to the mounting of the spindle of an ordinary drill press, which permits axial movement without interrupting the drive of the spindle. The spindle barrel 57, which is axially movable in the bracket 53, has secured thereto a downwardly extending arm 58, which arm carries at its lower end a cam roller 59, engaging the side edge of a cam 60, mounted on the carriage 14. The cam 60, like the cam 48, is a strip cam, that is, a cam formed on an elongated strip secured to the carriage so as to extend along the direction of travel thereof. In this manner the cam rollers 49 and 59 are caused to move along their respective cams as the carriage travels along the ways and while the blank 1 is passing their respective shaping tools.

The tool 51 is shown as conical in form and may be provided with an operating surface of abrasive material, as described for the tool 44. As the blank 1 passes the tool 51, the latter engages the outside edge thereof to form the outside top bevel 6. The shape of the cam 60 is such as to control the position of the cutter 51, moving it toward or away from the blank so as to form the curved beveled surface 6.

After passing the tool 51, the blank comes into engagement successively with two other tools to form the surfaces 7 and 8. The surface 7 is formed by a shaping tool 61 carried by a spindle 62, which forms the shaft of a motor 63, carried by a swinging arm 64 pivoted on an upright pivot 65 on the base 11 (Figs. 8 and 16). Mounted coaxially with the tool 61 and therebelow is a cam roller 66 adapted to engage a cam edge 67 on the cam plate 34. The roller 66 is suitably connected to the arm 64 by means of a bracket 68 so as to control the movement of said arm, and thereby the movement of the tool 61, in such a manner as to form the lower outside beveled surface 7.

Another shaping tool 69, carried by the shaft 70 of a motor 71 on an arm 72 pivoted at 73, all arranged similarly to the mounting of the tool 61 but on the opposite side of the machine, is arranged to form the inside heel bevel 8. A cam roller 74 mounted in a manner similar to that of the roller 66 is arranged to follow a cam edge 75 on the cam plate 34. Said edge 75 is arranged so as to cause the tool 69 to form the surface 8. However, the cam 75 terminates in an outwardly direction portion 76 adapted to move the tool 69 clear of the blank at the point where the surface 10 is to begin. Accordingly, the tool 61 operates on the blank from the middle of the rear curve of the heel clear to the front end of the blank, while the tool 69 operates from the same middle point of the heel forwardly only to the beginning of the surface 10.

In order to form the warped surface 10 a fifth shaping tool 77 operates in conjunction with means for tilting the table 37 on its pivots 36. This operation can best be explained in connection with Figures 12 and 13. The tool 77 is carried on a spindle 78 journaled in a bracket 79 for axial movement. This may also be arranged in the manner of a drill press, the spindle 78 being journaled in a barrel 80, vertically movable by means of a rack and pinion, indicated at 81. The bracket 79 may be mounted on a column 82 on the base 11. This bracket also carries a motor 83 connected by a belt 84 to drive the spindle 78.

A strip cam 85 carried by the carriage 14 is engaged by a roller 86 carried by an arm 87 pivoted at 88 on the base. This arm serves to confine the movement of the roller 86 to a single plane. Connected to the arm 87 beyond the pivot 88 is an adjustable link 89 whose upper end is pivoted at 90 to a lever 91 connected to the pinion shaft 92 of the rack and pinion 81. The cam 85, therefore, provides a control for the vertical movement of the tool 77.

Mounted to extend along the base below the ways and opposite the position of the tool 77 is a strip cam 93 which controls the tilting of the table 37. A follower roller 94 carried by a plunger 95 rolls upon the cam 93. The plunger 95 is slidable vertically in the carriage 14 and carries at its upper end a roller 96 adapted to engage the undersurface of the table 37. A spring 97 tends to move the table 37 downwardly on its pivots 36. The form and positions of the cams 85 and 93 are so coordinated that the tool 77 is adjusted in its elevation, while at the same time the table 37 is tilted to position the blank 1 angularly with respect to the tool 77, and both of these positions are varied progressively as the carriage moves past the cams 85 and 93 so that the tool 77 operates to form the warped surface 10 on the blank.

It has been found desirable to have a blank, such as shown in Figure 1, adapted to each shoe size and sometimes to each half size. Accordingly, a complete set of cams should be provided for each size of blank. These cams include the cam plate 34 and the cams 48, 60, 85, and 93.

The table 37 which carries the blank is equipped with means for holding the blank in position thereon during the forming operations. In the embodiment illustrated, the pins 45 are sharply pointed and the blank may simply be pressed down upon them. The table 37 may be provided with an end abutment 98 arranged to support the blank against the thrust of the various forming tools. The table 37 also has mounted therebelow, and pivoted on the pivots 36, an ejector bracket 99. This bracket is loosely mounted on the pivots 36 and normally drops downwardly on said pivots to a position determined by a stop finger 100 which holds the free side of the bracket 99 a certain distance below the table 37. The bracket 99 carries a pair of kick-off pins 101 positioned opposite holes 102 in the table 37. Mounted on the base 11 (see Fig. 8) at the rear end of the travel of the carriage is an ejector cam 103 positioned so that when the carriage arrives at this point the bracket 99 will engage the inclined surface of this cam to be forced upward thereby, turning on its pivots 36. This movement causes the pins 101 to be projected through the holes 102 to engage the underside of the blank 1 to force it off the pins 45. As the table 37 is inclined laterally at this point, the blank when released from the pins 45 slides downwardly off the table to be received in a suitable receptacle, not shown. The engagement of the stop 28 to release the latch 27 takes place immediately after the blank has been ejected in this manner, and the travel of the carriage is stopped and reversed.

That portion of the machine in which the forming tools operate is enclosed in a housing, only part of which is shown in the drawings. This housing comprises a pair of vertical walls 104, constructed of sheet metal or other suitable material and provided at suitable points with lateral extensions 105 to provide clearance chambers for the tools where they swing outwardly beyond the walls 104. This housing extends from a front wall 106 immediately ahead of the roll 47 rearwardly to a suitable point beyond the tool 77. A suitable cover is provided to fit down upon the walls 104, 105, and 106 with suitable clearance openings for the shafts of the motors 63 and 71. This cover may be made in sections so that it may be put in place around the shafts of the motors 63, 71, and the cutter 77, and may be provided with one or more suction connections to be connected to vacuum apparatus in a well known manner in order to carry off the cuttings. The cover of the housing and the vacuum connections are not shown as they may be of any suitable well known structure and are omitted in order to show other parts of the apparatus.

The lower edges of the walls 104 are provided with channels 107 adapted to receive the edges of a horizontally extending flexible closure or floor member 108 for the housing. In the embodiment illustrated this member 108 is provided in the form of a belt attached to the rear of a plate 116 on the carriage 14, extending rearwardly the entire length of the machine, passing over a suitable roller or rollers 109 at the rear of the machine, returning below the apparatus to the front of the machine, and passing over one or more front rollers 110, and thence back to the carriage 14, being attached to the front thereof. By this arrangement the belt 108 moves along with the carriage 14, providing a flexible floor or bottom for the closure or housing, so as to prevent the cuttings falling to the floor or upon the mechanism therebelow. As the carriage moves along the ways 13 the belt moves over the rollers 109 and 110 and slides at its edges in the channels 107.

A motor 111 having a shaft 112 is connected by means of a belt 113 to a pulley 114 on the rear end of the drive shaft 17. The motor 111 thus provides power to drive the shaft 17.

*Resumé of operations*

In the operation of this apparatus, starting with the carriage 14 at the front of the machine, as shown in Figure 8, the motors having been set in operation, the operator places an unformed blank upon the table 37 by pressing it down upon the pins 45 with its front edge against the abutment 98. He then starts the movement of the carriage by pulling the handle 114 of the starting lever 32 to the left (Figure 9). This swings the lever on its pivot 115 so as to raise the vertical end 31, which is positioned under the counter-shaft bracket 19. This movement of the lever raises the left-hand end (Figure 9) of said bracket 19, which pivots on the drive shaft 17 until the pinion 24 is engaged with the rack 26, at which time the latch 27 snaps into engagement with its stop on the carriage so as to retain the bracket 19 in raised position. So long as the drive shaft is in operation, the pinion 24 will be rotated through the agency of the gears 23 and 22 and the counter-shaft 21. Accordingly, as soon as the pinion 24 is brought into engagement with the rack 26, the carriage 14 will start to move rearwardly along the ways 13.

This movement of the carriage carries the blank successively past each of the shaping tools. First, as the blank passes under the roll 46, this roll presses it firmly down upon the table so as to avoid any chance of its being held up off the table, and, at the same time, the pressure of this roll engages the blank firmly with the pins 45. The blank next passes under the retaining roll 47 which holds the tip down while the first cutter 44 begins to operate upon it. As the blank passes rearwardly, the strip cam 48, acting through the roller 49 and the arm 50, controls the elevation of the cutter 44 so as to cause it to form successively the surfaces 5, 2, and 4 of the blank, as already described. As soon as the blank emerges from under the tool 44. The strip cam 60, acting through the roller 59 and the arm 58, controls the lateral spacing of the second shaping tool 51 so as to cause the latter to engage the blank and form the beveled surface 6 thereon.

When the blank has passed beyond the tool 51, the roller 66 engages the cam 67 of the cam plate 34, which causes the shaping tool 61 to engage the outside edge of the blank and to move in such a manner as to form the beveled outside edge 7.

The roller 74 next comes into engagement with the cam 75 on the plate 34, which causes the cutter 69 to engage the heel portion of the blank and to move the cutter in such a manner as to form the inside heel surface 8. The tool 69 is moved out of engagement with the blank as soon as the heel portion is passed. This is done by action of the out-turned portion 76 of the cam 75.

The blank now goes on until the roller 94 on the plunger 95 comes into engagement with the strip cam 93 at the rear of the machine. At about the same time the cam 85 on the carriage comes into engagement with the roller 86. These two cams 85 and 93 then act in cooperation, as already described, to control, respectively, the elevation of the tool 77 and the inclination of the table 37, so as to form the warped surface 10 on the blank.

As the carriage moves on beyond the cutter 77, the cam 103 engages the ejector bracket 99, causing the latter to tilt upwardly on its pivots 36 so as to project the pins 101 into the openings 102 and against the underside of the blank 1. These pins then operate to lift the blank off the pins 45 and permit it to slide laterally off the table and into a suitable receptacle, not shown. Immediately thereafter the stop 28 engages the latch 27, causing the latter to disengage and permit the counter-shaft bracket 19 to drop until the pinion 25 comes into engagement with the rack 29. This immediately reverses the movement of the carriage, which travels toward the front of the machine. At the end of the forward travel the vertical arm 31 of the starting lever engages the pin 33 to release the latch 30. At the same time, the bracket 19 is raised to neutral position so as to disengage the pinion 25 from the rack 29.

It will be seen, therefore, that this invention provides a simple and efficient apparatus for preforming blanks for lifts of the character described. The blank, carried by a suitable support, is moved so as to be engaged by different tools, each of which is controlled so as to form a certain desired surface on the blank. The forming tools are arranged so that they may engage the moving blank in a definite sequence and in proper timed relation so that the blank may be finished complete in a short time, while at the same time the movement of tools operating on the blank simultaneously is controlled so as to avoid subjecting the blank to undesirably heavy forces imposed by the operation of the tools.

The arrangements for mounting strip cams on the moving carriage provides that any shape may be given to the surface formed by a given tool by simply forming the cam which controls that tool to an appropriate shape. The various cams which operate on a single blank provide a set which determines the size and shape of that blank. These sets may be interchanged for forming blanks of different sizes. Furthermore, individual cams of any set may be varied so as to vary the shape of the blank in any desired manner.

Where special surfaces are required such as the warped surface 10, both the position of the tool and the angular relation of the blank thereto are controlled simultaneously and varied as the blank moves along. In this manner a surface of almost any desired shape may be formed on the blank.

The entire apparatus is organized so as to handle the making of a blank in a single operation and without the necessity of any manipulation by the attendant. Accordingly, highly skilled help for operating the machine is unnecessary. While the invention has been described as embodied in a unitary apparatus, it will be understood that individual or sub-combinations thereof may be useful by themselves without relation to other features or the complete combination, and that the employment of such individual features or sub-combinations is contemplated by this invention when within the scope of the appended claims.

It is obvious that various changes may be made in the details of construction and operation within the scope of the appended claims without departing from the spirit of this invention, and that the invention is not limited to the specific details shown and described.

The invention having thus been described, what is claimed is:

1. Apparatus for making lift-blanks of the character described, comprising, a base, a carriage mounted for travel along said base and having means to support a blank, a shaping-tool movably mounted adjacent the path of travel of said carriage for engagement with the blank thereon, and means controlled by the traveling movement of said carriage operating to vary the position of said tool with respect to the blank, so as to form the blank to a predetermined shape.

2. Apparatus for making lift blanks of the character described, comprising, a base, a carriage mounted for travel along said base and having means to support a blank, a shaping-tool movably mounted adjacent the path of travel of said carriage for engagement with the blank thereon, said tool having an angularly-positioned blank-shaping portion, and control means on said carriage engageable with complementary control means on said tool during the travel of said carriage in order to control the operation of said tool so as to form a curved beveled edge on said blank.

3. Apparatus for making lift-blanks of the character described, comprising, a base, a carriage mounted for travel along said base and having means to support a blank, a shaping-tool mounted adjacent the path of travel of said carriage for movement transverse to such travel, said tool having an angularly-positioned blank-shaping portion, and control means on said carriage engageable with complementary control means on said tool during the travel of said carriage in order to control the movement of said tool so as to form curved angular surfaces on the blank.

4. Apparatus for making lift-blanks of the character described, comprising, a base, a carriage mounted for travel along said base and having means to support a blank, a plurality of shaping-tools movably mounted adjacent the path of travel of said carriage for engagement with the blank thereon, and control means on said carriage engageable with complementary control means on said tools during travel of said carriage in order to vary the operation of said tools on the blank, so as to form the blank to a predetermined shape.

5. Apparatus for making lift-blanks of the character described, comprising, a base, a carriage mounted for travel along said base and having means to support a blank, a plurality of shaping-tools movably mounted adjacent the path of travel of said carriage for engagement with the blank thereon, said tools including a tool movable perpendicularly to a flat face of the blank adapted to form the blank to a varying thickness, and tools movable transversely to the direction of travel of said carriage adapted to form curved beveled surfaces along the edges of the blank, and means appropriately controlling such movements of said tools.

6. Apparatus for making lift-blanks of the character described, comprising, a base, a carriage mounted for travel along said base and having means to support a blank, a driving spindle mounted on a substantially horizontal axis and movable transversely of the direction of travel of said carriage, a shaping tool on said spindle, a strip-cam on said carriage extending along the path of travel thereof, a follower connected with said spindle and engaging and movable by said cam to cause said tool to shape the blank, a second driving spindle mounted on an upright axis and movable transversely of the direction of travel of said carriage, a second shaping-tool on said upright spindle, a second strip-cam on said carrier extending along its direction of travel, and follower means engaging said second cam and connected to cause movement of said second tool to shape another part of the blank.

7. Apparatus for making lift-blanks of the character described, comprising, a base, a carriage mounted for travel along said base and having means to support a blank, a shaping-tool movably mounted adjacent the path of travel of said carriage for engagement with the blank thereon, and means controlled by the traveling movement of said carriage operating to vary the relative positions of said tool and the blank so as to form a warped surface on the blank.

8. Apparatus for making lift-blanks of the character described, comprising, a base, a carriage mounted for travel along said base and having means to support a blank, a shaping-tool movably mounted adjacent the path of travel of said carriage for engagement with the blank thereon, and means controlled by the traveling movement of said carriage operating to vary the transverse spacing of said tool and the angular position of the blank so as to form a warped surface on the blank.

9. Apparatus for making lift-blanks of the character described, comprising, a base, a carriage mounted for travel along said base and having means to support a blank, a plurality of shaping-tools movably mounted adjacent the path of travel of said carriage for engagement with the blank thereon, said tools including a tool movable perpendicularly to a flat face of the blank adapted to form a blank to a varying thickness, and tools movable transversely to the direction of travel of said carriage adapted to form curved beveled surfaces along the edges of the blank, means for variably tilting the blank positioned to operate at the same time and in conjunction with one of said latter tools to form a warped surface on the blank, and means appropriately controlling such movements of said tools.

10. Apparatus for making lift-blanks of the character described, comprising, a base, a carriage mounted for travel along said base and having means to support a blank, a plurality of shaping-tools movably mounted adjacent the path of travel of said carriage for engagement with the blank thereon, said tools including a tool movable perpendicularly to a flat face of the blank adapted to form the blank to a varying thickness, and tools movable transversely to the direction of travel of said carriage adapted to form curved beveled surfaces along the outside side edge and the outside and inside heel edges of the blank, means for variably tilting the blank positioned to operate at the same time and in conjunction with one of said latter tools to form the inside edge of the blank to approximate the shape of a sole surface of a foot, and means appropriately controlling such movements of said tools.

11. Apparatus for making lift-blanks of the character described, comprising, a base, a carriage mounted for travel along said base and having means to support a blank in variable angular position, a shaping-tool movably mounted adjacent the path of travel of said carriage, a cam on said carriage, follower means engaging said cam and connected to cause movement of said tool while operating on the blank, a stationary cam mounted adjacent the path of travel of said carrier, and follower means on said carriage engaging said stationary cam and connected to cause variation in the angular position of the blank on said supporting means while being operated on by said tool.

12. Apparatus for making lift-blanks of the character described, comprising, a base, a carriage mounted for travel along said base and having means to support a blank in variable angular position, a shaping-tool movably mounted adjacent the path of travel of said carriage, means controlled by the traveling movement of said carriage to vary the spacing of said tool with respect to the blank, and means simultaneously controlled by such traveling movement connected to move said supporting means to vary the angular position of the blank, said several controlled means operating in conjunction to shape the blank to a form approximating that of the inner longitudinal arch of a foot.

13. Apparatus for making lift-blanks of the character described, comprising, a base, a carriage mounted for travel along said base and having means to support a blank in variable angular position, a shaping-tool movably mounted adjacent the path of travel of said carriage, said tool having an angularly-positioned blank-shaping portion, a cam on said carriage, follower means engaging said cam and connected to cause movement of said tool toward and from the blank while operating on the blank, a stationary cam mounted adjacent the path of travel of said carrier, and follower means on said carriage engaging said stationary cam and connected to cause variation in the angular position of the blank on said supporting means while being operated on by said tool whereby to shape the blank to a form approximating that of the inner longitudinal arch of a foot.

14. Apparatus for making lift-blanks of the character described, comprising, a base, a carriage mounted for travel along said base and having means to support a blank, a shaping-tool movably mounted adjacent the path of travel of said carriage for engagement with the blank thereon, means controlled by the traveling movement of said carriage operating to vary the position of said tool with respect to the blank, so as to form the blank to a predetermined shape, and a housing about said tool having a flexible bottom closure movable with said carriage.

15. Apparatus for making lift-blanks of the character described, comprising, a base, a carriage mounted for travel along said base and having means to support a blank, a shaping-tool movably mounted adjacent the path of travel of said carriage for engagement with the blank thereon, means controlled by the traveling movement of said carriage operating to vary the position of said tool with respect to the blank, so as to form the blank to a predetermined shape, a housing about said tool, and a flexible belt connected to move with said carriage and forming a lower wall of said housing.

16. Apparatus for making lift-blanks of the character described, comprising, a table providing a support for a blank, a shaping-tool engageable with a blank on said table to shape the blank, means for moving said table and said tool relatively, and means operating in accordance with such movement to vary the angular relation and the transverse displacement between said tool and the blank on said table in order to form the blank to a predetermined shape.

DANIEL F. HYLAND.
HUGO L. BRENNER.
JOHN BRENNER.
ELMER M. KNUDSEN.